United States Patent [19]
Langston

[11] Patent Number: 6,112,056
[45] Date of Patent: Aug. 29, 2000

[54] LOW POWER, SHORT RANGE POINT-TO-MULTIPOINT COMMUNICATIONS SYSTEM

[75] Inventor: J. Leland Langston, Richardson, Tex.

[73] Assignee: Cisco Systems, Inc., San Jose, Calif.

[21] Appl. No.: 09/481,054

[22] Filed: Jan. 11, 2000

Related U.S. Application Data

[62] Division of application No. 08/477,031, Jun. 7, 1995, Pat. No. 6,006,069.

[51] Int. Cl.$^7$ .................................................. H04B 15/00
[52] U.S. Cl. .............................................. 455/62; 455/524
[58] Field of Search .............................. 455/62, 63, 67.1, 455/25, 101, 103, 60, 422, 517, 524, 561, 562, 41; 343/853, 797, 891, 890; 348/6; 342/361, 362, 363, 364, 365, 366

[56] References Cited

U.S. PATENT DOCUMENTS 4,747,160  5/1988  Bossard ................................... 455/422
5,771,449  6/1998  Blasing et al. ......................... 455/562

Primary Examiner—Reinhard J. Eisenzopf
Assistant Examiner—Marsha D. Banks-Harold
Attorney, Agent, or Firm—Baker Botts L.L.P.

[57] ABSTRACT

A point-to-multipoint or two-way communications system is provided by a nodal transmitter located in a node with a plurality of nodal antennas radiating different polarization signals about the node. The system includes subscriber stations with directional antennas adapted to receive signals radiated from the nodal transmitter. The system may additionally include capability for transmitting and radiating subscriber signals to the nodal transmitter location for two-way communications.

41 Claims, 7 Drawing Sheets

LOW POWER, SHORT RANGE POINT-TO-MULTIPOINT COMMUNICATIONS SYSTEM

This application is a divisional of U.S. application Ser. No. 08/477,031 filed Jun. 7, 1995 now U.S. Pat. No. 6,006,069.

TECHNICAL FIELD OF THE INVENTION

This invention relates to point-to-multipoint delivery of communication services and more particularly to broadcast systems operating in the millimeter frequency range.

BACKGROUND OF THE INVENTION

Communication systems operating over a wide range of frequencies, modulation techniques, multiplexing techniques, error correction techniques, protocols, and network topologies are known in the state-of-the-art. Many recent papers have described numerous techniques for wireless transmission of two-way, switched narrowband services (e.g., TDMA time division multiple access) cellular, TDMA PCS (personal communication system), CDMA PCS (Code Division Multiple Access), etc. Many military systems such as JTIDS (Joint Tactical Information Distribution System), SINCGARS (Single Channel Ground and Airborne Radio System), PLRS (Position Locating and Report System), and MILSTAR (a military satellite communication system) have shown that wireless transmission can provide integrated voice and data services. It has been proposed that some form of television distribution or communication distribution systems may be provided by utilizing devices in the millimeter wave frequency band, which is between 28 GHz and 300 GHz using short range cellular transmitters covering small areas which are fed, e.g., by an underground cable in a manner similar to cellular radio. This distribution may also be made using microwaves converted at the local stations to the millimeter waves for local distribution. The distribution to millimeter wave stations may also be done by a fiber optic system or satellite distribution system.

A discussion of millimeter wave stations appears in the IEEE Spectrum of June 1982, pages 54–59, entitled, "Low-Power Television-Short Range, Low Cost TV Stations are in the Offing as the FCC Prepares to Establish Broadcast Requirements." U.S. Pat. No. 4,747,160 entitled, "Low Power Multi-function Cellular Television System" of Bossard describes a low power, point to multipoint cellular television system operating in the 27.5 to 29.5 GHz frequency band with Omni-directional antennas. A 29 GHz point-to-point radio system for local distribution is described e.g., the British Telecom Technical Journal, vol. 2, no. 1, January 1984, entitled, "29 *GHz.-Point-to-Point Radio Systems for Local Distribution*" by S. A Mohamed and M. Pilgrim.

It is highly desirable to provide some means to deliver improved broadband, wireless point-to-multipoint distribution service in millimeter frequency range.

SUMMARY OF THE INVENTION

In accordance with one preferred embodiment of the present invention, a low power, short range, wireless point-to-multipoint communication system is provided by a nodal transmitter located in a given node and a plurality of unidirectional transmitting antennas coupled to said transmitter are positioned to radiate in different directions from the node and about the node. The unidirectional antennas being of polarization types such that the polarization of the transmitted signal alternates about the node. A plurality subscriber stations about the node have receiving antennas polarized to receive signals from a selected one of the uni-directional antennas.

DESCRIPTION OF PREFERRED EMBODIMENTS

Figure 1:
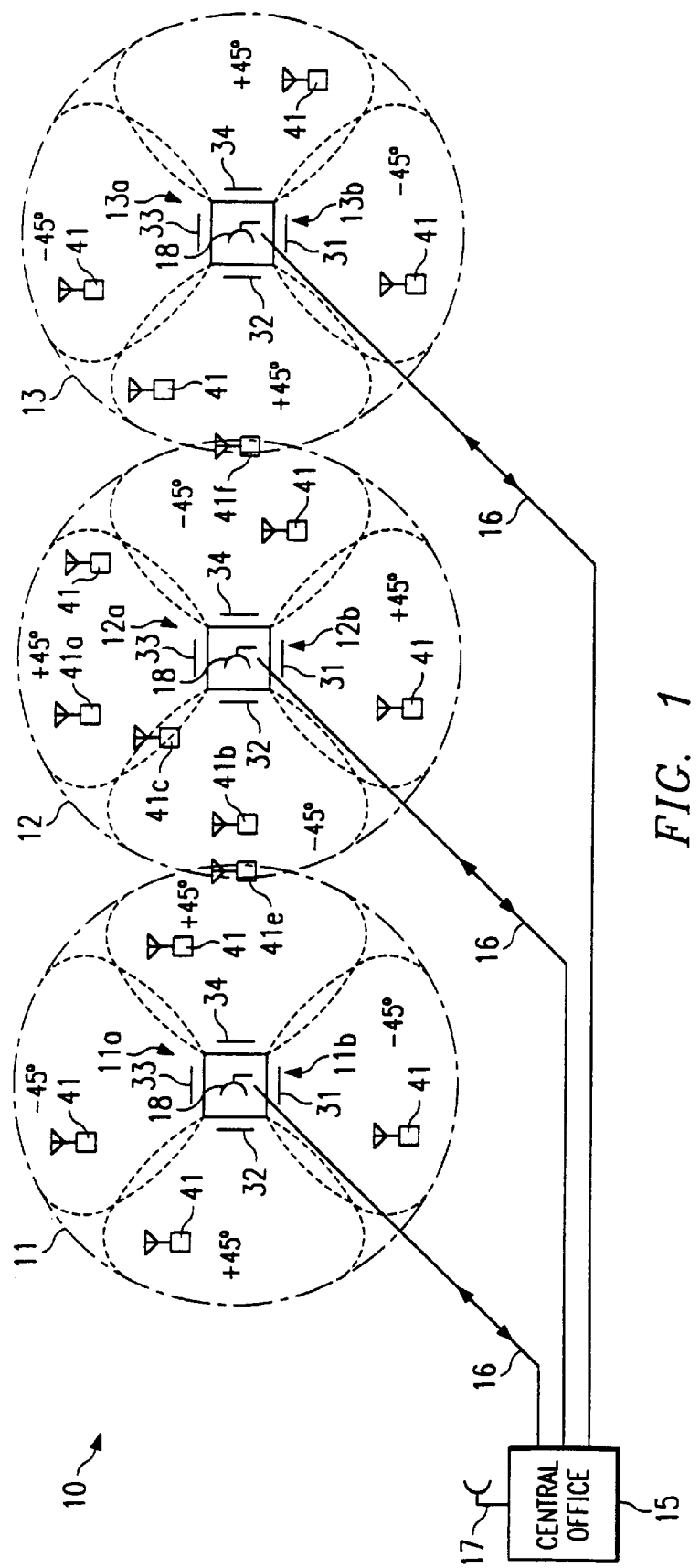
FIG. 1 illustrates the system according to one embodiment of the present invention.

Referring to FIG. 1, there is illustrated the distribution system network 10. This network comprises a plurality of nodes, such as node 11 through 13 covering a given combined area. For example, this area may cover a few city blocks only, but with hundreds of such nodes the area may comprise an entire large city. A central office 15 would be, for example, the central message center or source of programming for distribution to the other nodes 11 through 13. Each of the nodes would include a nodal broadcast transmitter or transmitter and receiver system. This is represented by system 11a, 12a, and 13a in the center of the nodes 11 through 13. The transmission from the central office 15 to the nodal broadcast transmitter systems 11a, 12a, or 13a may be done by cabling in or around the city such as fiber optic telephone exchange cables represented here as cable 16 between the central office 15 and the node transmitter systems 11a, 12a, and 13a. This coupling may also be done using microwave antennas such as using antenna 17 from the central office 15 communicating with antennas 18 at the center of the nodes at the systems 11a, 12a, or 13a. This distribution may be implemented in a variety of other configurations well known in the state of the art.

Figure 2:
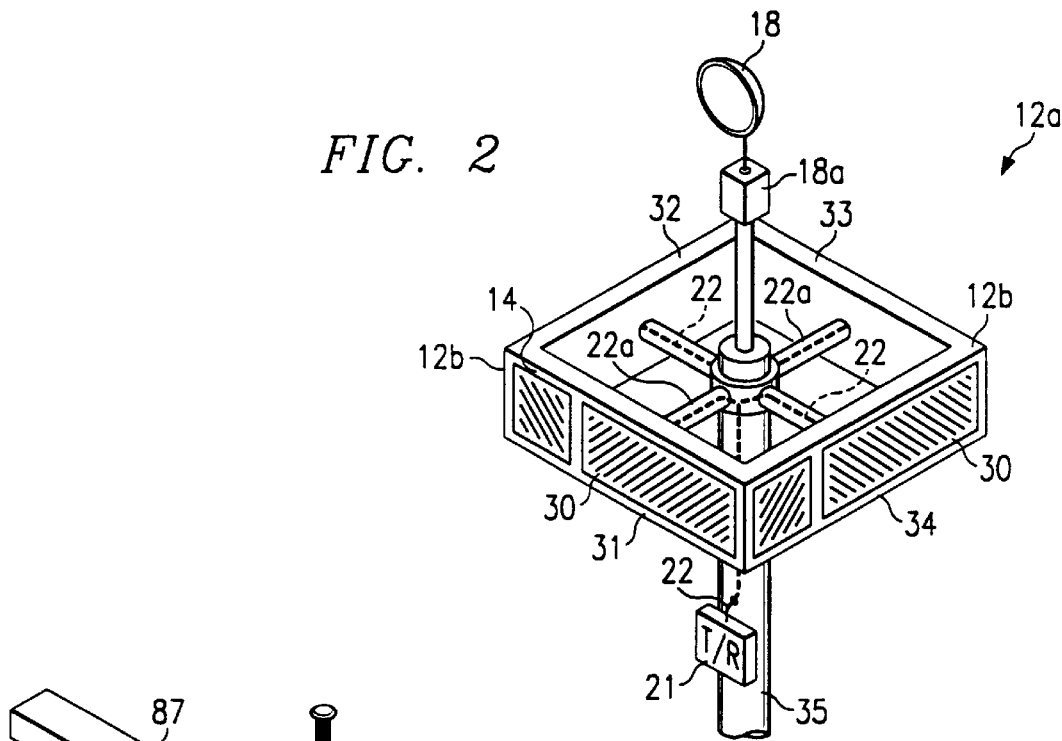
FIG. 2 illustrates a nodal broadcast system in FIG. 1.

Referring to FIG. 2, there is illustrated a sketch of a nodal broadcast transmitter or system 12a. In the case of microwave distribution from a central office, there is the microwave antenna represented schematically by 18. The nodal transmitter broadcast systems 11a and 13a are like system 12a illustrated in FIG. 2, but with the polarizations indicated in the sketches as +45° rotation and −45° (315°) rotation of FIG. 1. (Other orthogonal polarization may be used, e.g., vertical and horizontal polarization). The system 12a includes a post 35 for supporting a four-quadrant sectorized antenna complex system represented by 12b. The system 12a includes a transmitter and receiver represented schematically by 21. Signals transmitted from system 12a are coupled from transmitter 21 to the nodal transmitter coverage or broadcast antenna system 12b comprised of four panel array antennas 31, 32, 33, and 34 via leads 22. The panel antennas 31–34 are mounted to post 35 via supports 22a housing transmission lines 22. Each of these panel antennas 31–34 comprises an array of transmitting antenna elements and receiving antenna elements as will be discussed in more detail later. Polarization of these antenna elements 30 for antenna system 12b is such that panels 31 and 33 for system 12b transmit 45° slant polarized waves (marked +45° in FIG. 1), while panels 32 and 34 for system 12b transmit −45° (315°) slant polarized waves (marked −45° slant in FIG. 1). See FIG. 1. A more detailed description of these panel antennas follows in connection with later figures.

These panel antennas, for example, produce a 90 degree beam width so that each of the panel antennas 31–34 covers approximately 90 degrees beam width and the polarization from these panel antennas 31–34 alternates from +45° slant polarization to −45° slant (315°) polarization to +45° slant polarization and then to −45° (315°) polarization about the center of the node on post 35. This, therefore, provides a 360 degree pattern about the center of the node where the node broadcast transmitter is located.

The adjacent nodes 11 and 13 on either side of node 12 present orthogonal polarization. For example, the panel antennas 31 and 33 in nodes 11 and 13 produce −45° (315°) polarized signals and the panel antennas 32 and 34 in nodes 11 and 13 produce +45° polarized signals. Therefore, at the adjacent sectors of the nodes, that is where node 11 is adjacent to node 12, the polarizations are orthogonal, and where node 12 meets node 13 the polarization is orthogonal. The node broadcast transmitting antennas systems 11b, 12b and 13b transmit and communicate with receiving stations 41 scattered in the area of the nodes.

Receiving station 41 maybe located anywhere in any of the nodes 11–13 and will receive the signal radiated from the antenna complex at the center of one of the nodes from the sectorized antenna system 20. The polarization of the receiving station 41 would determine which sector it is receiving from. For example, the receiving station 41a in FIG. 1 in node 12 would be in the +45° slant polarized sector and receive +45° slant polarized signals from the panel antenna 33 of system 12b. Station 41b in node 12 would receive preferably −45° (315°) slant polarized signals from the panel antenna 32 and not +45° polarized signals from panels 31 or 33 from system 12b or from panel 34 of system 11b. For the receiving antenna 41c, located in the overlapping area of the pattern of 32 and 33, it is possible to receive both +45° polarized signals from panel antenna 33 and 45° (315°) slant polarized signals from panel antenna 32. However, a signal received from the face which is of the wrong polarization from the antenna 41 would be 20 to 30 db lower in power than the other face. For example, if the antenna of 41c was −45° (315°) polarized it would receive the signal from panel antenna (+45° polarized) 33 of system 12b from 20 to 30 db down from that of the −45° (315°) polarized signal from antenna 32 of system 12b. Similarly, stations 41e and 41f at the edges of nodes 11 and 12 and 12 and 13, respectively, achieve similar isolation based on polarization. That is, station 41e with a −45° (315°) polarized antenna picks up signals from panel antenna 32 of system 12b. The signals from panel antenna 34 of system 11b are 20 to 30 db lower than those from panel antenna 32 of system 12b.

The system is designed such that the signals from all four panels 31–34 are transmitting at the same carrier frequencies but may contain different information. The system is dependent upon space (different coverage areas) as well as frequency and polarization diversity.

The system, as described herein, utilizes a four-quadrant sectorized antenna. However the system could be of any even number of sectors such as two, four, eight, etc. The four-quadrant sectorized antenna discussed in FIG. 1 has an azimuth pattern relatively flat over a plus and minus 45 degrees from the center (90° beam width) which is easy to implement and is, therefore, more easily implemented, for example on a building or a tower for mounting panel antennas. An octagon, or eight sector, antenna system may be practical in some cases, but receivers located a line drawn to the corners will be able to see more than two panels and, hence, see signals having the same polarization. Thus, the four sector is the preferred embodiment where frequency re-use is required.

The transmission to and from the central office 15, as stated previously, may include a microwave network with the microwave dish 18 coupled to a transceiver via an up/down converter 18a. The received signals from the central office 15 are upconverted to millimeter waves and sent via the panel antennas and the received signals at the panel antennas are down converted to microwave frequencies and sent back to the central office 15 via antenna 18 or cables 16. (Other frequencies, e.g., millimeter frequency, may also be used to interconnect the nodes).

Figure 3:
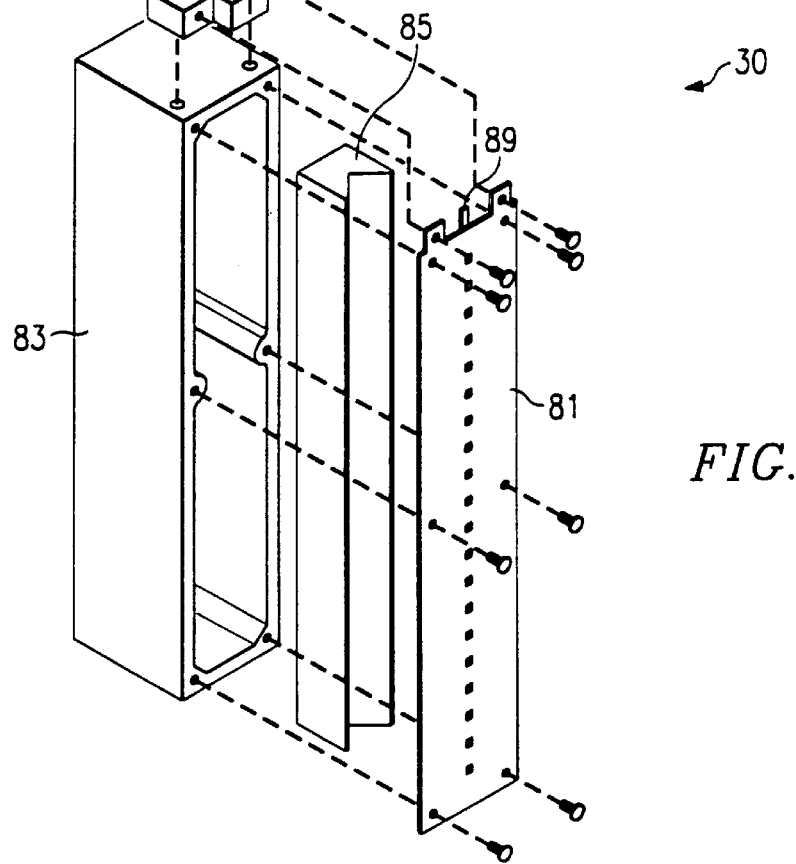
FIG. 3 illustrates an assembly view of a linear array according to one embodiment of the present invention.

It is highly desired in accordance with the present invention that the elevation angle of the node antenna beam be in the order of 10 degrees. This is achieved in each of the panel antennas by linear arrays of antenna elements as shown in FIGS. 3–6. Referring to FIG. 3, each linear array 30 includes a patch antenna array 81 mounted on conductive housing 83. A back lobe absorber 85 is placed behind the patch array 81. The millimeter waves are coupled by a millimeter waveguide 87 to the patch array 81. A probe 81 passes through an insulated opening in the waveguide to transition to a microstip line of the patch antenna.

Figure 4:
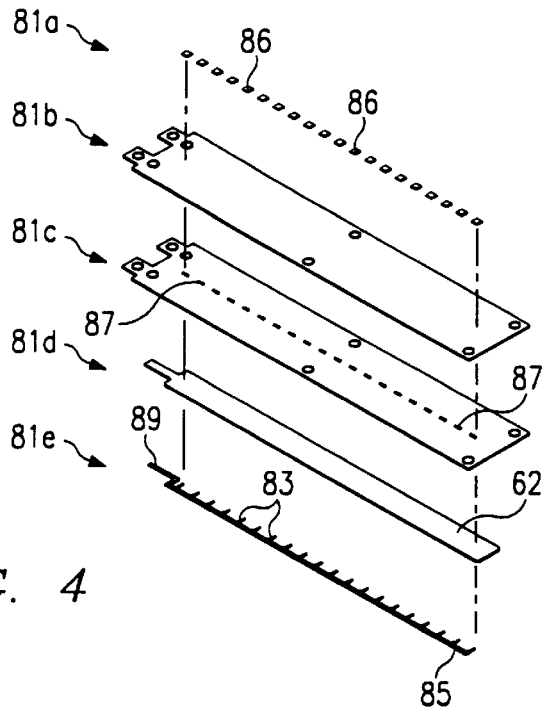
FIG. 4 illustrates layers of patch antenna array of FIG. 3.
Figure 5:
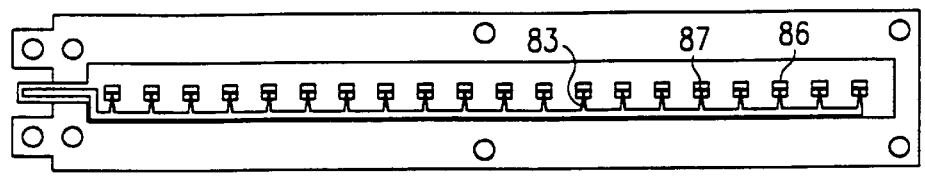
FIG. 5 illustrates a composite sketch of the patch antenna of FIG. 4.

Referring to FIG. 4, there is illustrated the layers of the patch antenna array 81. The outboard layer 81a is layer 1 comprising 20 conductive radiating patches 86. The patches are 0.007 inch copper and are 0.1×0.12 in on 0.278 inch centers. Behind layer 81a is layer 81b which is 0.015 thick dielectric. Layer 81c is a 0.007 inch copper layer with 0.070×0.006 inch slots 87 on 0.278 centers with a slot aligned behind each patch. Layer 81c is on opposite surface of dielectric layer 81b with respect to layer 81a. Layer 81d is a dielectric layer between the slot radiator of layer 81c and the radiators of layer 81e. Layer 81d is 0.10 in. thick with an aperture 62 cut out over the slot area. Layer 81e is a 0.0007 inch copper line with 20 exciter stubs 83 aligned with the slots and the patches. The stubs 83 are connected to each other via a conductive line 85 with the spacing between the stubs controlling the phase (phase shifter) between the radiating elements. The one end 89 of the line forms the coupling probe for the waveguide. An illustrated composite sketch is shown in FIG. 5 with housing. The stubs 83 are behind and cross slots 87 and the slots are behind the patches 86. This antenna array provides horizontal linear polarization. For additional information on an antenna similar to this, see "*A Reciprocity Method of Analysis for Printed Slot and Slot Coupled Antennas*" by David Pozer in IEEE Transactions on Antennas and Propagation, vol. AP-34, no. 21. The printed circuit antenna panels 31 and 33 for 12b may each be like that shown in FIG. 6 with 16 linear arrays 48 for 16 transmitter carrier channels (ch1–ch16 for 27.86 GHz to 28.50 GHz or channel 1–16 for 28.50 GHz to 29.5 GHz).

Figure 6:
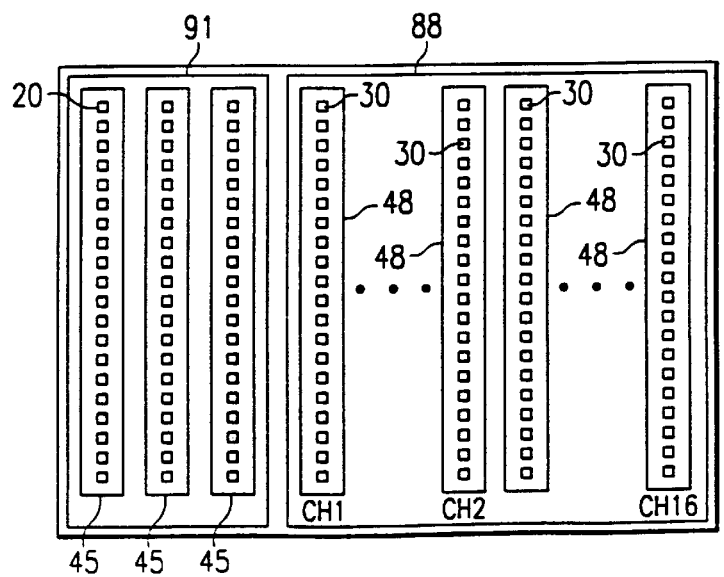
FIG. 6 illustrates one panel antenna according to one embodiment of the present invention.
Figure 7:
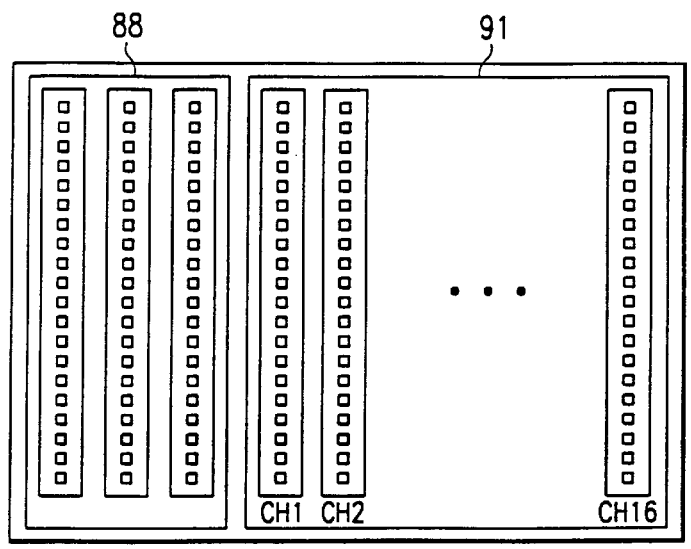
FIG. 7 illustrates a second panel antenna for transmitting and receiving polarization orthogonal to that in FIG. 6.
Figure 8A:
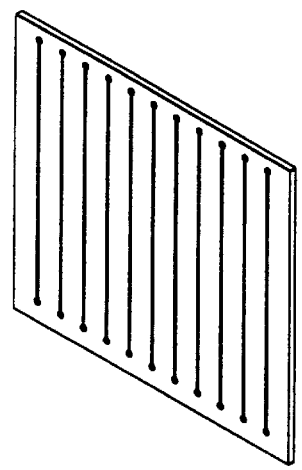
FIG. 8 illustrates the polarizers.
Figure 8B:
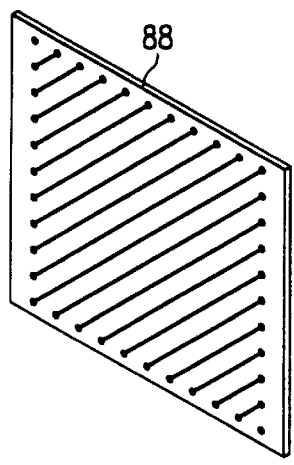
Figure 8C:
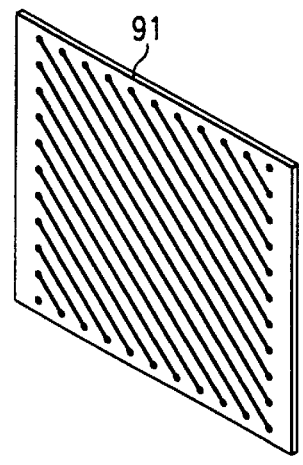

Each panel antenna 31–34 covers the frequency band from 27.5 GHz to 28.5 GHz or 28.5 GHz to 29.5 GHZ. In accordance with the preferred embodiment with 45° slant polarization, a polarizer layer 88 (shown in outline in FIG. 6 and 7) is placed over the 16 linear arrays 48 to produce +45° slant polarization. The polarizer layer 88 has a vertical grid on inboard surface and a 45° grid on the outboard surface layer as shown in FIGS. 8a and 8b. On the left most part of the antenna panels are three receiving linear arrays 45 operating over a frequency band of 27.5–27.64 GHz or 29.38–29.5 GHz. There are three different 40 MHz wide receiving channels in this band. These may be used for telephony. The receiving linear arrays 45 also have a polarizer layer 91 but with outboard grid rotated in the 315° direction or −45° to rotate the polarization orthogonal. The panels 31 and 33 at nodal system 12a use the polarizers as shown in FIG. 6 and the panels 32 and 34 use the polarizers 88 and 91 reversed as shown in FIG. 7. The antenna pattern may be tailored (shaped) to provide desired radiator pattern. The same panel antenna could be horizontal and vertical dipoles. The patch antennas could provide horizontal and vertical polarization by not placing polarizer layer over the patch antenna for horizontal polarization and an additional layer over the +45° layer to produce vertical polarization.

In applicant's preferred embodiment herein, the stations 41 include transceivers which receive the broadcast RF carrier channels (ch1–ch12 for service provider 1) and can transmit back to the systems 11a, 12a, or 13a on the return carrier frequencies 27.5–27.62 for service provider 1. The receive array polarization on the panels are orthogonally polarized with respect to the transmit arrays. In this manner, there is spacial, as well as polarization and frequency isolation, between the transmit and receive antennas on the panels. There could also be a linear array of 20 dipoles for each of the 16 RF transmitter carrier channels and each receiver channel. Each linear array for each channel could comprise 20 dipoles which are fed by conductive pairs as dipoles forming vertical dipole antennas. Adjacent in a horizontal plane could be horizontally polarized dipole elements. These panels include a reflective surface 37 behind the dipoles to form a uni-directional antenna that radiates generally a fairly uniform pattern over a 90 degree beam width.

Figure 9:
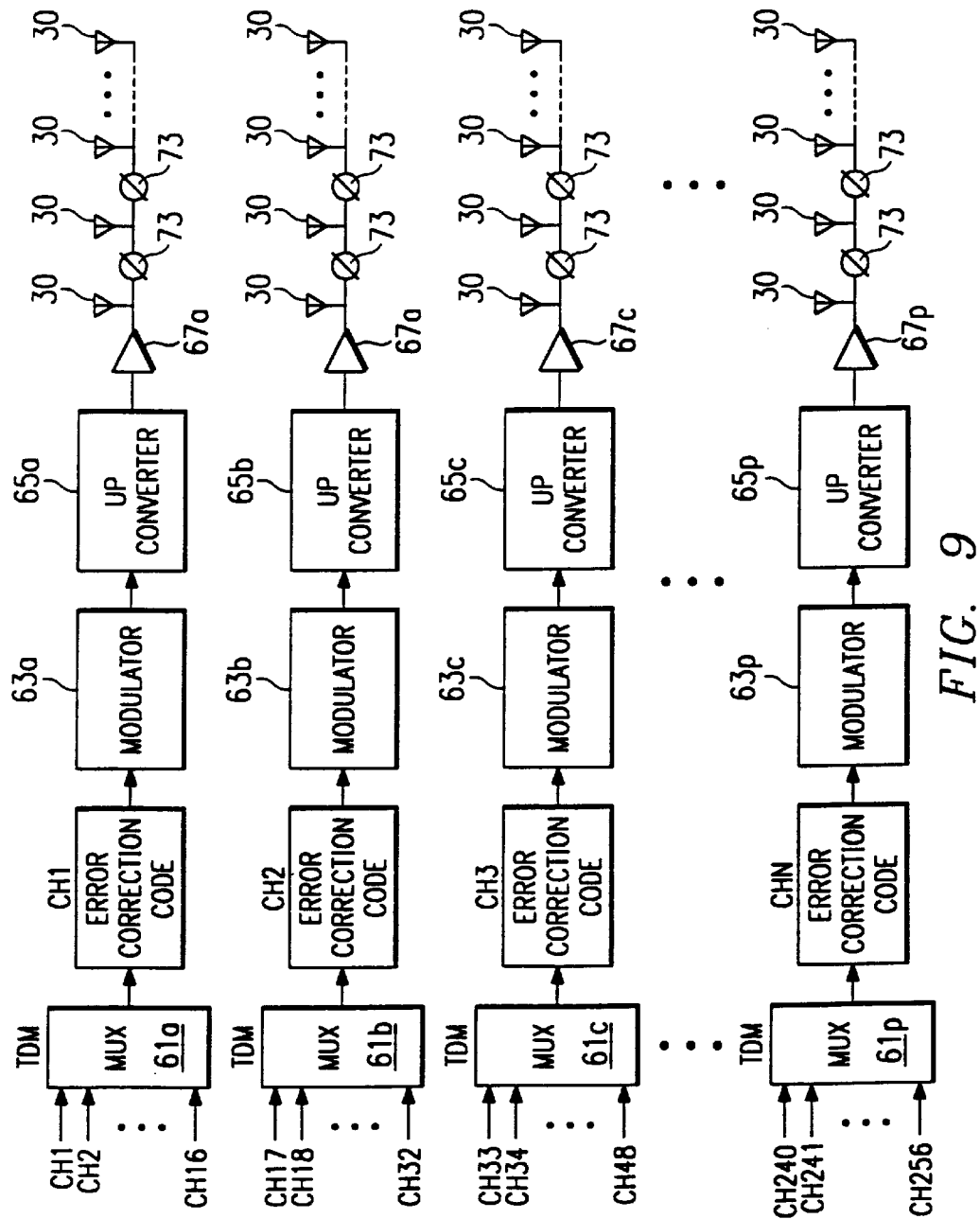
FIG. 9 illustrates the time multiplexing system according to one embodiment of the present invention.

In accordance with the present invention as represented by FIG. 9, the channel information from 16 video channels is time multiplexed at multiplexers 61a–61p and applied to each RF carrier channel 1 through channel 12. Each of these 16 video channels is provided at a 3 MBS (megabits per second) rate, so for the 16 video channel the rate is 48 MBS. These are separately modulated using e.g. a QPSK (Quadrature Phase Shift Keying) modulator (63a–63p) and separately up converted at converter (65a–65p) to the millimeter frequency and power amplified at separate amplifiers 7a–67p and applied to a given linear patch antenna array of the 20 patches as illustrated in FIGS. 3–6. A Forward Error Correction (FEC) code is applied by placing an encoder before each modulator. In this manner each information channel is modulated onto a low frequency RF carrier and up converted by upconverter 65 to the final millimeter frequency and amplified by a dedicated power amplifier 67 and applied to the antenna array for that carrier channel (1–12). In this approach, all the amplifiers power goes to a narrow, single band carrier. The linearity requirements on the amplifier are much reduced since it must only meet the linearity requirements of the narrow 60 MHz channel frequency band signal being transmitted, e.g., the amplifier can be operated in saturation for FM or near saturation for Quadrature Phase Shift Keying (QPSK). It is extremely important that the power amplifier operate in a linear mode to prevent interference between channels caused by intermodulations distortion; therefore, this system of multiple low power transmitters operating in amplification and modulation over very narrow frequency bands and using separate antennas and combining the outputs in space accomplish the low intermodulation distortion according to the present invention.

Figure 10:
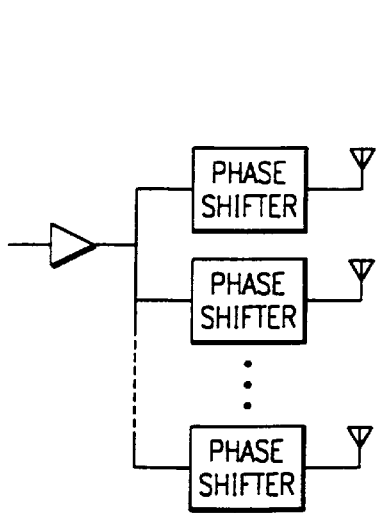
FIG. 10 illustrates a common amplifier for all elements of a linear array.
Figure 11:
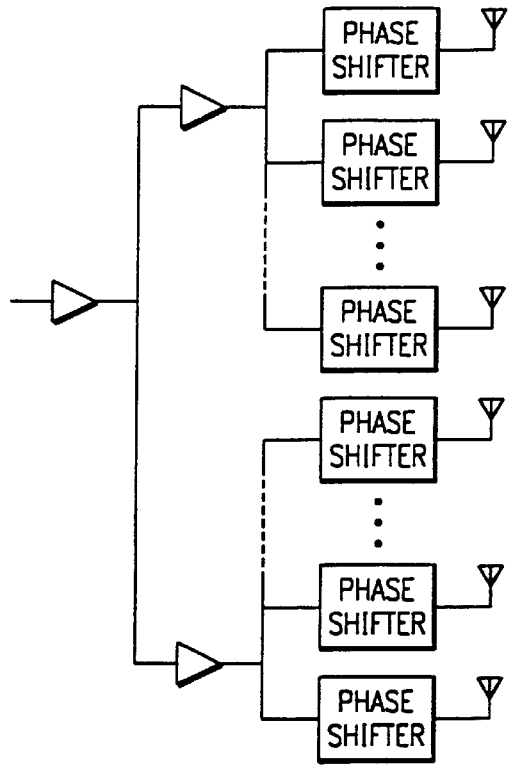
FIG. 11 illustrates an amplifier tree feeding the element of an array.
Figure 12:
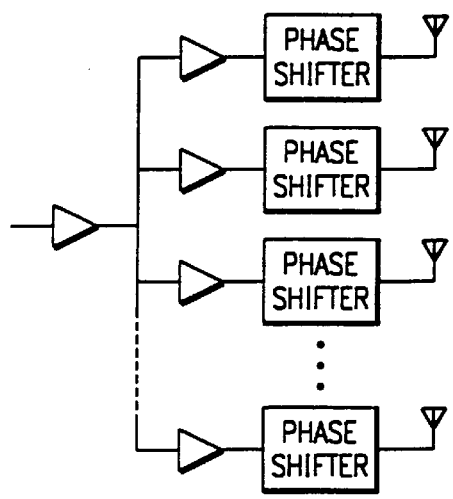
FIG. 12 illustrates separate antenna for each elements.
Figure 13:
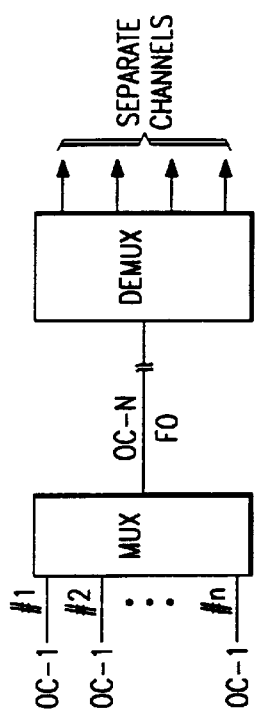
FIG. 13 illustrates multiplexing DC-1 signals.

In order to form the narrow vertical antenna pattern, it is necessary that the linear array be phased in a proper proportion between each of the 20 radiating patches 30, and this is accomplished by phase shifters 73 between the amplifiers 67 and the antenna radiators 30 as represented in FIG. 9. One amplifier 67 may be used for all twenty radiators 30 of a linear array as shown in FIGS. 10 and 12, or two amplifiers as shown in FIG. 11—one for each ten radiators. The amplification preferably is done as illustrated in FIG. 12 with amplifiers for each of the antenna radiators 30 separately. The amplification may also be done by power dividers dividing up the signal to amplifiers and then combining the signals. The phase shifts can be adjusted by the distance between the stubs 83 of FIG. 4.

Analog modulation techniques pose certain problems for Local Multipoint Distribution Services, or LMDS. Although FM techniques have been shown to be effective in multi-path environments as well as provide good video Signal-to-Noise (S/N) when employed for LMDS applications, FM is very inefficient in terms of spectrum utilization. A single NTSC video channel will use 18–30 MHz of spectrum to achieve the desired signal to noise improvement. Another advantage of FM is the "capture effect", i.e., its ability to suppress other signals which are below some threshold level although the interference may be on the same frequency. AM is more efficient in terms of bandwidth, but requires much higher receiver Carrier-to-Noise (C/N) ratios for a given output signal S/N ratio compared to FM. In addition, AM does not offer any capture effect to help discriminate against multi-path or interference on the same frequency.

Video compression techniques have been developed which can reduce the required bandwidth for any given video channel. These techniques have been demonstrated in numerous applications including CATV, video conferencing, HDTV, etc. The use of video compression in conjunction with certain forms of digital modulation solve a particular problem when a solid state transmitter is used. In particular, it has been shown that video compression can be used to increase channel capacity for any transmission system, e.g., CATV, MMDS and standard as well as High Definition TV broadcast. The use of video compression can also be used to advantage to enable an LMDS Node transmitter to be practically implemented with solid state amplifiers as will be presently shown.

If the single-channel-per-carrier architecture described above is implemented while using existing CATV format signals, i.e., AM-VSB signals and digital channels based on 6 MHz channel spacing, i.e., one carrier every six MegaHertz, then 130 carriers are required per antenna sector for a bandwidth of 780 MHz. For a solid state transmitter, this would require 130 separate transmit channels and 130 Power Amplifiers per sector. By digitizing the video and using video compression techniques, each video channel can be reduced to a low bit rate per video channel. Then by multiplexing many of these digital bit streams together into a single, high-speed serial bit stream (e.g., an STS-1 or STS-3) the number of RF channels can be reduced. However, this is a baseband signal which cannot be transmitted directly using LMDS. It can, however, be used to modulate a constant-envelope carrier to produce a signal which can be transmitted via LMDS. The advantage of this approach is that many video signals can be transmitted on a single carrier, e.g., 16 video channels can be transmitted on a single RF carrier at an information rate of 48 MBPS and with a rate ½ FEC in a bandwidth of 60 MHz (or less) per RF channel. This is shown in FIG. 9. Hence, over 192 such video channels can be transmitted within the 780 MHz of bandwidth using only 12 RF carriers. This is less than 1/10 the number of RF channels required using prior art, i.e., AM-VSB and digital modulation using 6 MHz channels. Hence, video compression enables many video channels (a few) to be multiplexed onto a single RF carrier (rather than many) and still provide more video channels in the same bandwidth (i.e., approximately 50 percent more) than prior art. The pay-off for a solid-state transmitter is both obvious and substantial: less than 10 percent of the number of RF channels is required for the same number of video channels (assuming comparable modulation). Thus, video compression can be used in LMDS applications to reduce the number of required RF channels, and thus the amount of hardware, while increasing the number of video channels.

Prior art in LMDS designs has used techniques which are not compatible with digital Fiber Optic systems including but not limited to Synchronous Optical Network (SONET), ATM, and Digital Service-level 3 (DS-3) transmission systems. This application shows how a solid state LMDS transmitter can interface to and be compatible with the higher speed transmission systems (SONET) and advanced switching techniques (ATM). While prior art has shown that ATM techniques can be used for video service via CATV networks, this application discloses how an LMDS system can provide video service using ATM technology. Specifically by demultiplexing complex OC-n signals down to OC-1 signals and implementing the LMDS system as a group of n parallel transmitters, a SONET-compatible LMDS system can be implemented using solid state transmitters. Such a system can provide ATM-based video service. In other words, as shown in FIG. 10., the OC-1 signals at data rate of 51.84 MBPS are multiplexed at the central office 15 and sent via fiber cables 16 (FIG. 1) to the node transmitter/receiver where they are demultiplexed and applied to separate RF carrier channels.

While the down stream digital transmission system can implement SONET/ATM formats relatively easily, the return path is much more difficult. Prior-art implementation has shown that the return channel can be implemented as either low-data-rate TDMA circuits, or as narrowband FDM circuits. The problem with either of these approaches is that they require a large number of transmitters and receivers at the node, and neither can easily provide bandwidth on demand. This invention shows how the number of transmit/receive channels at the node can be reduced and how each user can be assigned bandwidth on demand. This problem is solved by using broadband TDMA techniques in conjunction with the number of time slots assigned to a user based on demand rather than being pre-assigned.

A major limitation on the return channel is that the receive modem at the node must acquire both carrier sync and clock sync for each user's transmission. However, the nature of two-way telephony places major constraints on the maximum interval between burst transmissions. Specifically, Plain Old Telephone Service (POTS) uses 2-wire analog transmission in the local loops. Hence echoes are returned from the far end. The time delay is a function of path length and length between samples (interval between pulse or frame transmissions in a TDMA system). The maximum time delay which can be tolerated before the echo becomes annoying is about 15 msec. Since any given circuit may involve transversal of many different multiplexers as well as long paths, the delay in any given multiplexer must be held to a minimum. The choice of cell length for ATM was set at a maximum of 53 bytes of which 48 are payload (384 bits) to minimize total path delay and hence echo effects. At 51.84 MBPS, this corresponds to about 82 microseconds per cell. A maximum of 768 DS0 channels can be transported by a single OC-1 circuit. The data rate for a DS0 channel is 64 KBPS. A buffer which stores data corresponding to 384 periods at 64 KBPS would create 6 msec of voice delay. This is excessive, and hence a cell is made up of more than one DS0 channel, e.g., one byte from 48 channels or one byte from each channel of a digroup. This reduces the time delay to 0.125 msec for each voice circuit. This assumes that 48 such DS0 circuits are available at a multiplexer; this is practical at the node but not at the customer site. Transmitting only one byte per frame is also not practical. Alternatives include: (1) Transmit a single DS0 channel over a carrier; (2) Maintain sufficiently accurate clock sync so that data can be recovered with minimum overhead; (3) Use CDMA in conjunction with TDMA to allow for overlapping transmissions; (4) Use segmented cell transmission with a slotted buffer at the node receiver to reconstruct the cells. The first solution is not practical because of the large number of receivers required; the second is not practical because of variations in path parameters; the fourth is difficult to implement because of the switching time associated with turning the transmitter on and off in such a short time period (less than 0.1 microseconds) and the set-up time of the AGC on the receiver The third approach allows the transmission time to be extended without changing the transmission rate or reducing the efficiency. However, it requires both a more complex transmitter and a more complex receiver. The following description delineates the implementation.

Figure 14:
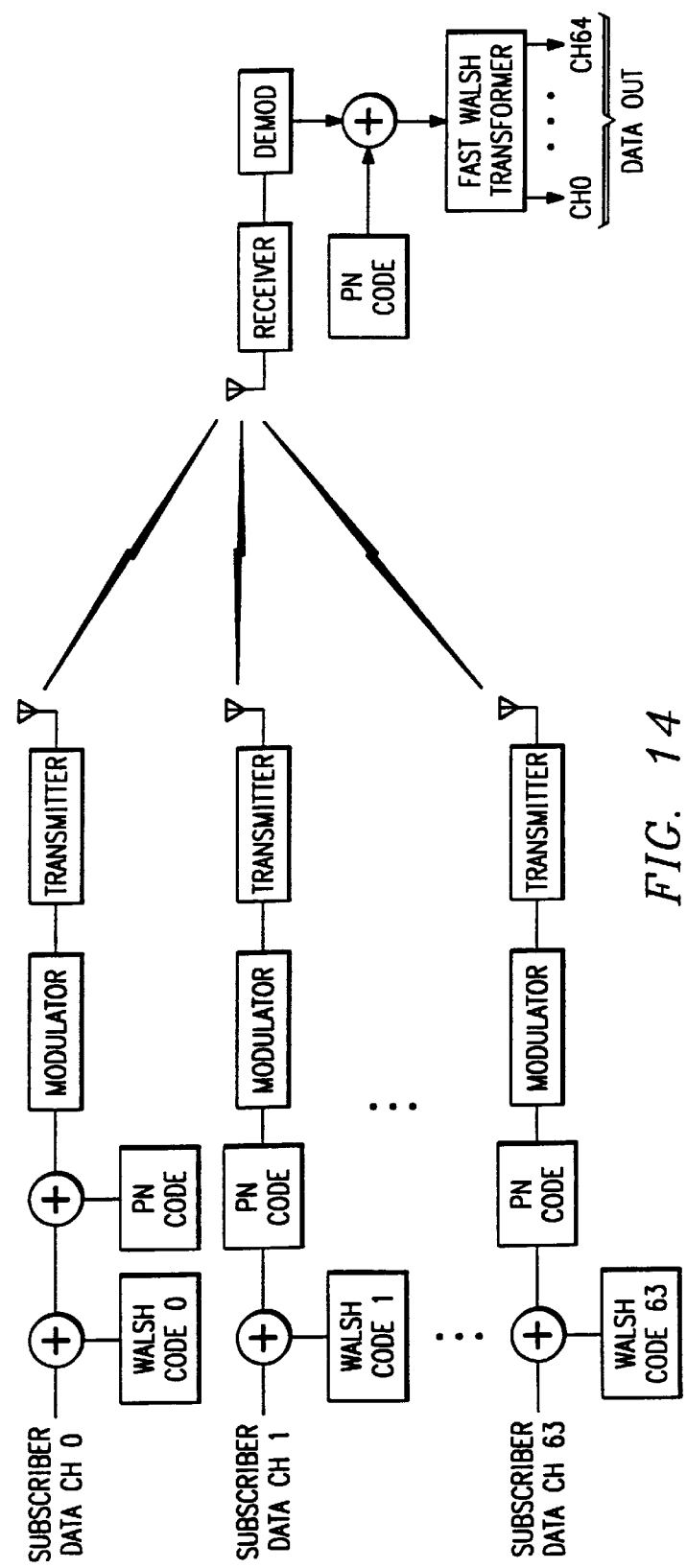
FIG. 14 illustrates code division multiplexing.

Each bit of each byte of each packet (cell) is encoded using a suitable code, e.g., a Walsh function having order 6 or length 64. There exist 64 such unique orthogonal codes (See FIG. 14). One of these is assigned to each of 63 channels. Each channel then transmits either code or inverted code (depending on whether the data bit is 0 or 1. The period of the code is 64 clock periods. Hence, each bit is expanded into 64 code bits or chips. Eight consecutive data bits are transmitted in succession, resulting in the transmission of 512 code bits in succession. In addition, a unique preamble is transmitted. At the same time 63 other customer units will transmit one byte of data using orthogonal codes from the Walsh function set. Hence, there will be 63 simultaneously transmitted message having a duration of about 9.877 microseconds. Each message will be preceded b a preamble having a duration of approximately 5 microseconds. Hence, each packet or burst has a total duration of approximately 14.877 microseconds. At a data rate of 48 MBPS, this permits approximately 400 channels to be transmitted. The maximum time between samples is about 0.16 msec, well within the acceptable range.

The impact on the customer end hardware is the need to add a simple encoder to spread the data signal by a factor of 64. The impact on the node receiver is the need to provide at least 63 code correlators for each STS-1 receive channel. However, this can be implemented as a Fast Walsh Transform (FWT) if time is aligned accurately enough.

While the preceding discussion related the implementation to ATM packets and SONET rates, a similar argument can be made for DS0 and DS3 formats.

The approach for the return channel is the preferred embodiment. However, it is not the only approach. Other approaches include using individual channels for each DS0 or voice channel, i.e., the same as analog cellular phone service. A second approach is to use PCS format (either TDMA or CDMA technology) for the return channel. These may be implemented in either of at least two ways: (1) Simply co-locate a cellular or PCS base station with each node and a cellular or PCS phone at each customer site. (2) Use the same format at PCS (e.g., TDMA or CDMA but translated to the LMDS band for subsequent distribution to customers. At each customer site, translate the signal to the PCS band, use a built-in PCS handset function to demodulate the databand connect to wiring. (Or alternately provide a pica-cell radiator at the customer location). Approach number two has the distinct advantage of not using the PCS band for fixed telephone service as well as offering additional capacity over PCS.

Other Embodiments

Although the present invention and its advantages have been described in detail, it should be understood that various changes, substitutions and alterations can be made herein without departing from the spirit and scope of the invention as defined by the appended claims.

For two-way service, time division multiplexing or code division multiplexing is used to provide Demand Assign Multiple Access (DAMA) capability. CDMA reduces the peak transmit power required at the subscriber transmitter, and hence minimal the necessary transmit-receive isolation in the subscriber equipment.

What is claimed is:

1. A short range, wireless, point-to-multipoint communications system comprising:
    a plurality of transmitter systems each broadcasting over a same given frequency band wherein each of said transmitter systems comprises a plurality of contiguous sub-frequency band transmitters;
    a plurality of unidirectional transmitting antennas located at a common location of a node coupled to said transmitter systems and positioned to radiate in different directions about said node;
    said unidirectional antennas being of orthogonal polarization types and positioned such that one polarization type is spaced about said node between orthogonal polarization types so the polarization of the transmitted signal alternates orthogonal polarization about said node;
    each of said unidirectional antennas comprising a plurality of linear arrays of radiating elements with a phase shifter between each radiating element, each of said linear arrays of said unidirectional antennas coupled to one of said contiguous sub-frequency band transmitters; and
    plurality of receiver stations with each of said receiver stations having a directional receiver station antenna directed and polarized to receive signals from said unidirectional transmitting antennas.

2. The system of claim 1 wherein there is an amplifier for each linear array.

3. The system of claim 1 wherein the phase shifters provide proportional phasing between each radiating element.

4. The system of claim 1 wherein each of said sub-frequency band transmitters includes a modulator and an amplifier.

5. The system of claim 4 wherein each modulator is a QPSK modulator.

6. The system of claim 4 wherein each of said sub-frequency band transmitters include a time division multiplexer.

7. The system of claim 6 wherein said time division multiplexer receives multiple compressed digital video channels and multiplexes them into a single bit stream for application to said modulator.

8. The system of claim 7 wherein said video channels transmit ATM packets.

9. The system of claim 8 wherein said receiver stations includes a receiver/transmitter at the node wherein said receiver/transmitter is assigned bandwidth on demand using TDMA techniques in conjunction with time slots assigned on demand.

10. The system of claim 9 wherein said transmitter/receiver includes an ATM switch.

11. The system of claim 10 wherein said sub-frequency transmitters transmit ATM packets and said transmitter/receiver sends ATM packets using TDMA and on demand time slots.

12. The system of claim 10 wherein each of said sub-frequency band transmitters is a CDMA transmitter.

13. The system of claim 1 wherein the linear arrays are vertical linear arrays.

14. A short range, wireless, point-to-multipoint transmission system comprising:
    a plurality of transmitter systems each broadcasting over a frequency band with each of said transmitter systems comprising a plurality of contiguous sub-frequency band transmitters;
    a plurality of unidirectional transmitting antennas located in said node and coupled to said transmitter systems and positioned to radiate in different directions about said node;
    said unidirectional antennas being of orthogonal polarization types and positioned such that one polarization type is spaced about said node between orthogonal polarization types so the polarization of the transmitted signal alternates orthogonal polarization about said node; and
    each of said unidirectional antennas comprising a plurality of vertical linear arrays of radiating elements with a phase shifter between each radiating element, each of said vertical linear arrays of said unidirectional antennas coupled to one of said sub-frequency band transmitters.

15. The system of claim 14 wherein there is an amplifier for each linear array.

16. The system of claim 14 wherein the phase shifters provide proportional phasing between each radiating element.

17. The system of claim 14 wherein each of said sub-frequency band transmitters includes a separate modulator and an amplifier.

18. The system of claim 17 wherein each modulator is a QPSK modulator.

19. The system of claim 18 wherein each of said sub-frequency band transmitters includes a time division multiplexer.

20. The system of claim 19 wherein said time division multiplexer receives multiple compressed digital channels and multiplexes them into a single bit stream for application to said modulator.

21. The system of claim 20 wherein said digital channels transmit ATM packets.

22. The system of claim 14 including a polarizer for each linear array.

23. The system of claim 14 wherein said system is a telephony system and said sub-frequency transmitters are modulated with telephony.

24. The system of claim 14 wherein said system is a video system and said sub-frequency transmitters are modulated with video information.

25. The system of claim 14 wherein said transmitters are modulated with data signals.

26. The system of claim 14 wherein SONET OC-n signals are demultiplexed to OC-1 signals and the OC-1 signals are multiplexed at a central office and sent to the node which includes a node receiver where the OC-1 signals are demultiplexed and applied to said sub-frequency transmitters.

27. A short range, wireless, point-to-multipoint communications system comprising:
- a base station transmitter/receiver system comprising a base station transmitter and associated base station receiver located within a given node;
- a base station antenna system having alternating polarization type transmit antennas and receive antennas about said node;
- said transmit antennas coupled to said base station transmitter to separately radiate said given frequency band signals at alternating orthogonal polarizations from sector to sector about said node;
- said receive antennas coupled to said associated base station receiver for receiving signals from subscriber stations which transmit alternating orthogonal polarization signals from sector to sector about the node;
- a plurality of subscriber stations with each of said subscriber stations including a subscriber transmitter/receiver coupled to a subscriber directional antenna system directed and polarized to receive signals from said base station transmitting antennas and for transmitting subscriber signals to said base station receiver antennas such that the polarization of said signals from said subscriber stations from sector to sector about said node alternates polarization, wherein said base station transmitter comprises a plurality of contiguous sub-frequency band transmitters together transmitting over said given frequency band for each sector, wherein each said base station transmit antennas comprises a plurality of linear arrays of radiating elements with a phase shifter between each radiating element, each of said linear arrays of said base station transmit antennas are coupled to one of said sub-frequency band transmitters.

28. The system of claim 27 wherein the phase shifters provide proportional phasing between each radiating element.

29. The system of claim 28 wherein said sub-frequency band transmitters transmit ATM packets and said subscriber transmitter of said transmitter/receiver sends ATM packets using TDMA in on demand time slots controlled by an ATM switch.

30. The system of claim 27 wherein the phase shifters are used to form a narrow vertical antenna pattern.

31. The system of claim 27 wherein said subscriber stations wherein a subscriber transmitter of said subscriber receiver/transmitter provides means for modulating a carrier with signal intelligence; said intelligence including time division multiple access (TDMA).

32. The system of claim 31 wherein said subscriber transmitter transmits in packet bursts.

33. A wireless point-to-multipoint transmission system comprising:
- a transmitter means for generating signals over a given band of frequencies; and
- an antenna system located at a point in a node and coupled to said transmitter means for radiating signals over said given band of frequencies about said node; said antenna system comprising a plurality of spaced unidirectional antennas and said unidirectional antennas including one polarization type spaced between two opposite polarization types so the polarization alternates about the node, each of said unidirectional antennas comprising a plurality of linear arrays of radiating elements with a phase shifter between each radiating element, each of said linear arrays of said unidirectional antennas coupled to one of said contiguous sub-frequency band transmitters.

34. The system of claim 33 wherein each of said unidirectional antennas includes a plurality of vertical linear arrays.

35. The system of claim 34 wherein there is an amplifier for each linear array.

36. The system of claim 34 wherein the phase shifters provide proportional phasing between each radiating element.

37. The system of claim 34 including a polarizer for each linear array.

38. The system of claim 33 wherein said system is a telephony system and said transmitter means is modulated with telephony.

39. The system of claim 33 wherein said system is a video system and said transmitter means is modulated with video information.

40. The system of claim 33 wherein said transmitter means is modulated with data signals.

41. The system of claim 33 wherein SONET OC-n signals are demultiplexed to OC-1 signals and the OC-1 signals are multiplexed at a central office and sent to the node which includes a node receiver where the OC-1 signals are demultiplexed and applied to said transmitter means.

* * * * *